No. 639,264.  Patented Dec. 19, 1899.
W. J. MORGAN.
HOOK FOR DROP WIRES OF SPINNING OR OTHER TEXTILE MACHINES.
(Application filed June 2, 1899.)

(No Model.)

Witnesses
J. G. Hinkel
Arthur A. Fisher

Inventor
William J. Morgan
by Foren Freeman
Attorneys

THE NORRIS PETERS CO., PHOTO-LITHO., WASHINGTON, D. C.

UNITED STATES PATENT OFFICE.

WILLIAM J. MORGAN, OF PATERSON, NEW JERSEY, ASSIGNOR TO THE MITCHELL-BISSELL COMPANY, OF NEW YORK, N. Y.

HOOK FOR DROP-WIRES OF SPINNING OR OTHER TEXTILE MACHINES.

SPECIFICATION forming part of Letters Patent No. 639,264, dated December 19, 1899.

Application filed June 2, 1899. Serial No. 719,144. (No model.)

*To all whom it may concern:*

Be it known that I, WILLIAM J. MORGAN, a citizen of the United States, residing at Paterson, Passaic county, State of New Jersey, have invented certain new and useful Improvements in Hooks for Drop-Wires of Spinning or other Textile Machines, of which the following is a specification.

The objections and difficulties attending the use of metallic hooks for drop-wires are well known.

While some forms in use have advantages over others, there is no one form which is both sufficiently durable and sufficiently compact, while all of them require constant watching to prevent the injurious results following any imperfection in the article. Porcelain hooks have been used with great advantage as regards durability; but the forms heretofore devised are either too cumbersome or too liable to be broken.

The object of my invention is to produce a hook adapted for attachment to any form of drop-wire or other object for use in textile machines, as spinning, twisting, doubling, or winding or reeling machines and looms, combining in one guide the two characteristics of strength and compactness more perfectly than in other guides of ordinary constructions, and to this end I construct the hook as fully set forth hereinafter and as shown in the accompanying drawings, in which—

Figure 1:
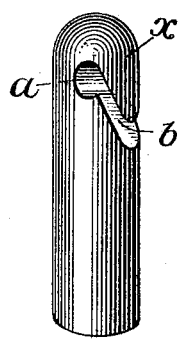
Figure 2:
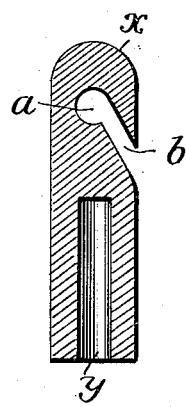

Figure 1 is an external perspective view of my improved hook for drop-wires, &c. Fig. 2 is a sectional view.

The hook is of glazed porcelain and the general outline is cylindrical or of substantially uniform diameter throughout with a transverse eye $a$, a narrow inclined slot $b$ leading thereto at one side with a rounded end $x$ and with a socket $y$, adapted to receive the wire or other object to which the hook is attached. In the article thus constructed I secure the smoothness, hardness, and durability of the porcelain with great compactness and freedom from projections, so that the article is not liable to be broken by one guide coming into contact with another from vibration of the wires during the working of the machine or in dropping down from breaking of threads. It takes up but little more room than the wire which supports it and can be used where numerous ends are doubled together and can be attached to the wire or other object, so that it can be easily threaded from either hand, and yet owing to the peculiar construction of the eye the yarn is prevented from falling out.

While I have illustrated the hook as having a socket for attachment to the drop-wire, it may be otherwise constructed to secure such connection.

While I have described my improved hook as being of porcelain, it may be made of metal coated or enameled with porcelain or of other equivalent material, as vitreous material.

It will be evident that while the hook is shown as consisting of a cylindrical rod or block, one of octagonal or other form of substantially uniform diameter throughout would answer the purpose.

Without limiting myself to the precise construction shown, I claim—

1. A hook for guiding thread in textile machinery, consisting of a vitreous block of substantially uniform diameter throughout, recessed at one end for attachment to a wire, and provided near the other with a transverse eye and an inclined slot leading thereto at one side, substantially as set forth.

2. A hook for drop-wires consisting of a block of porcelain having a socket at one end and with a transverse eye and inclined slot near the opposite end, substantially as set forth.

In testimony whereof I have signed my name to this specification in the presence of two subscribing witnesses.

WILLIAM J. MORGAN.

Witnesses:
FREEMAN CASS,
HERMAN P. FRANK.